United States Patent [19]
Lakhani et al.

[11] Patent Number: 6,064,864
[45] Date of Patent: May 16, 2000

[54] ANTENNA INTERLOCK FOR HOUSING ASSEMBLY

[75] Inventors: Sunil Lakhani, Atlantic Highlands, N.J.; Jerrold S. Pine, Boca Raton, Fla.; David R. Vogelpohl, Atlantic Highlands, N.J.

[73] Assignee: Lucent Technologies Inc., Murray Hill, N.J.

[21] Appl. No.: 09/057,029

[22] Filed: Apr. 8, 1998

[51] Int. Cl.[7] .............................. H04B 1/38; H01Q 1/24; H04M 1/02

[52] U.S. Cl. ............................. 455/90; 455/550; 343/702; 379/433

[58] Field of Search .............................. 455/90, 550, 575, 455/562, 129; 379/428, 440, 433; 343/702, 883, 899, 901, 906; 361/814, 815

[56] References Cited

U.S. PATENT DOCUMENTS 5,343,213  8/1994  Kottke et al. ........................... 343/702
5,584,054  12/1996  Tyneski et al. .......................... 455/566
5,754,141  5/1998  Thompson et al. ..................... 343/702

*Primary Examiner*—Dwayne D. Bost
*Assistant Examiner*—Erika A. Gary

[57] ABSTRACT

The present invention provides an antenna interlock system comprising an upper housing and a lower housing. The upper housing has first and second interlock tabs disposed along its interior wall, which correspond to third and fourth interlock tabs disposed along the interior wall of the lower housing, the interlock tabs each having an aperture shaped to closely receive the antenna unit. The interlock tabs are disposed relative to each other such that when the upper and lower housings are assembled together, the apertures in the interlock tabs together define a pathway for receiving the antenna unit, and such that when the antenna unit is inserted through the antenna opening and into the receiving apertures, the antenna unit and the interlock tabs hold the upper and lower housing together.

18 Claims, 4 Drawing Sheets

ANTENNA INTERLOCK FOR HOUSING ASSEMBLY

BACKGROUND OF THE INVENTION

1. Field of the Invention

The present invention relates generally to improvements in housings for portable electronic devices, and particularly to advantageous aspects of an antenna interlocking arrangement for use in portable telephones.

2. Description of the Prior Art

The housing for small electronic devices, e.g., portable telephones, typically includes upper and lower housings that fit together in a predetermined configuration. During the manufacturing process, an electronic sub-assembly is placed between the upper and lower housings, which are then fitted together around the sub-assembly and then attached to each other using various means known in the art, including screw fasteners and zipper assemblies. Where a screw fastener is used, the screw typically passes through a hole in the exterior wall of one of the housings and is received by a threaded post on the interior wall of the opposite housing.

These prior art structures have a number of known disadvantages. First, the use of screws or other fastening means typically require additional parts, which adds to the manufacturing costs. Further, these prior art structures require the use of a tool, such as a screwdriver, to assemble the apparatus in the manufacturing process, and then to disassemble and reassemble the portable telephone in the field for maintenance or repair. In addition, screws or other prior-art fastening means can in themselves be a source of mechanical failure. For example, the screw threads may become stripped, or the screw post may fracture. This is particularly a problem in portable telephones, as they are used in a wide range of environments and are subject to various stresses and shocks.

There is thus a need for a housing fastening system that does not require the use of additional parts or assembly equipment and which is resistant to damage.

SUMMARY OF THE INVENTION

The present invention overcomes these and other disadvantages of the prior art by providing an antenna interlock system comprising an upper housing and a lower housing, each having interlock tabs disposed along its interior wall, the interlock tabs each having an aperture shaped to closely receive the antenna unit. The interlock tabs are disposed relative to each other such that when the upper and lower housings are assembled together, the interlock tabs together define a pathway for receiving the antenna unit, and such that when the antenna unit is inserted into the receiving apertures, the antenna unit and the interlock tabs hold the upper and lower housing together.

Additional features and advantages of the present invention will become apparent by reference to the following detailed description and accompanying drawings.

DETAILED DESCRIPTION

Figure 1:
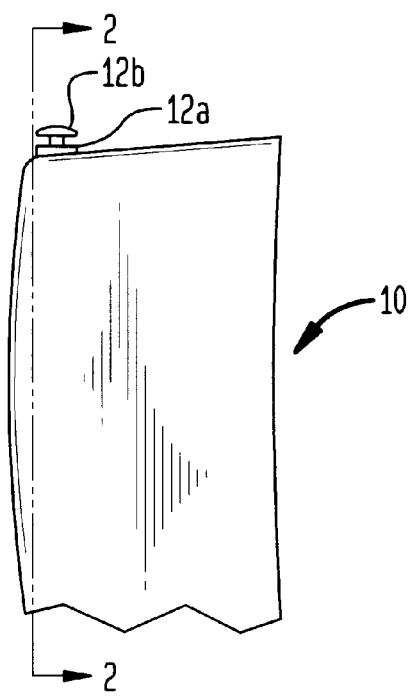
FIG. 1 shows a front view of a portable telephone incorporating an antenna interlock system according to the present invention.

FIG. 1 shows a simplified plan view of a portable telephone unit 10 according to the present invention. As shown in FIG. 1, the telephone 10 has a substantially rectangular profile. The telephone 10 includes an antenna unit that extends down the length of the interior of the portable telephone, proximate to the left side, and protrudes from the top of the telephone. The antenna unit includes an antenna housing 12a and a telescoping antenna element 12b, which is slidably mounted inside the antenna housing 12a. When the telephone 10 is in use, the antenna element 12b is slid out of the antenna housing 12a to a fully extended position, while the antenna housing 12a remains in a fixed position relative to the body of the portable telephone 10. The telescoping antenna element 12b is mounted inside the antenna housing 12a in such a way to prevent the telescoping element 12b from being pulled entirely out of the antenna housing 12a. It will be appreciated in light of the following discussion that the present invention can also be practiced with a non-extendible antenna of fixed length.

Figure 2:
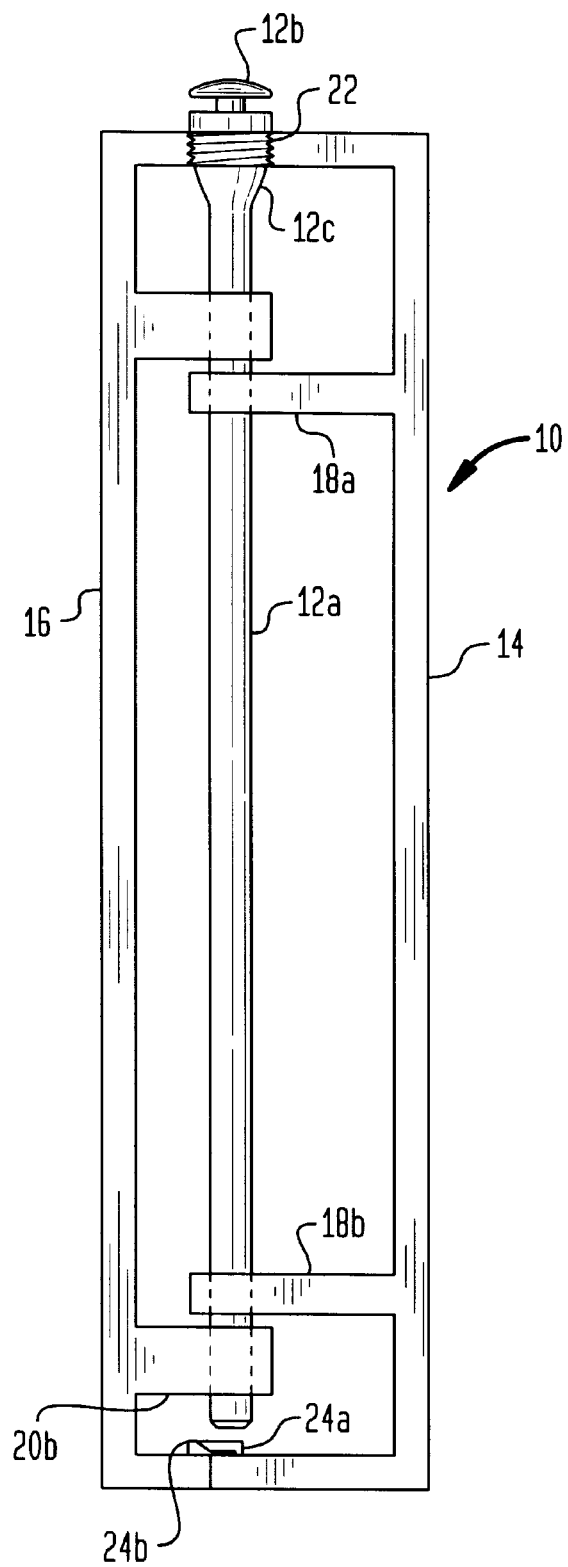
FIG. 2 shows a cross section diagram through plane 2—2 of the portable telephone shown in FIG. 1

FIG. 2 shows a cross section diagram of the major components of a portable telephone unit 10 incorporating an antenna interlock system according to the present invention. In the present invention, the antenna unit itself holds the upper housing 14 and lower housing 16 together. This eliminates the need for screws or other fastening means. As described above, these prior art structures have known disadvantages.

As shown in FIG. 2, the upper housing 14 includes first and second interlock tabs 18a, 18b disposed along its interior wall, proximate to the ends thereof. Corresponding third and fourth antenna interlock tabs 20a, 20b are disposed along the interior wall of the lower housing 16. The interlock tabs 18a, 18b, 20a, 20b are of sufficient length to extend across the path of the antenna housing 12a. In addition, the interlock tabs 18a, 18b on the upper housing 14 lie immediately between the interlock tabs 20a, 20b on the lower housing 16, such that the interlock tabs on the upper and lower housings abut each other. It will be seen that this arrangement serves to hold the upper and lower housings 14, 16 in position relative to each other along the longitudinal axis of the antenna unit 12a, 12b.

The interlock tabs 18a, 18b, 20a, 20b are preferably molded integrally with the upper and lower housings 14, 16. The use of an integral molding technique has the advantage of ease of manufacture and strength. However, it would be possible, if desired, to use interlock tabs that are manufactured separately from the housings, and then subsequently attached to the housings.

Each interlock tab 18a, 18b, 20a, 20b includes an aperture that is of a shape and size to closely receive the antenna housing 12a. The receiving apertures are shown in FIGS. 3 and 4, and discussed further below. When the upper and lower housings 14, 16 are assembled together, the apertures line up with each other, thereby defining a pathway for insertion of the antenna unit 12a, 12b.

The lower housing 16 further includes an external opening 22 for receiving the antenna. In a preferred embodiment, the antenna housing 12a includes a threaded portion 12c near its top that is screwed into corresponding threads molded into the external opening 22. When the upper and lower housings are assembled together, the external opening 22 is in line with the apertures in the interlock tabs, thereby allowing the antenna to be inserted through the external opening and the apertures in the interlock tabs and then screwed into place.

Although in the present embodiment the external opening 22 is threaded, and molded into the lower housing 16, it will be appreciated that alternative structures may also be used in accordance with the present invention. For example, the external opening can be formed in the upper housing rather than the lower housing. Alternatively, the external opening can be formed by molding corresponding half openings into the upper and lower housings. In addition, it is also possible to use a twist fit or a snap fit arrangement to hold the antenna housing in place.

It will be seen that the antenna housing 12a, in combination with the interlock tabs 18a, 18b, 20a, 20b, serves to lock the upper and lower housings 14, 16 together. The antenna unit 12a, 12b is coupled to the telephone circuitry by means of an antenna clip or other contact device. Preferably, the antenna clip lies in the path of the antenna unit 12a, 12b so that insertion of the antenna housing 12a into the receiving apertures in the interlock tabs 18a, 18b, 20a, 20b also brings the antenna unit into contact with the antenna clip.

As further shown in FIG. 2, the presently preferred embodiment also includes corresponding snap elements 24a, 24b molded into the bottom edge of the upper and lower housings 14, 16 that snap together. The snap elements are provided to hold one end of the upper and lower housings 14, 16 together until the antenna housing 12a can be inserted through the receiving apertures down the full length of the telephone. In addition, the snap elements 24a, 24b provide additional stability to the telephone 10 after it is assembled. It would also be possible to substitute a hinge element for the snap elements, or a combination of hinge and snap elements, as well as other fastening elements, as desired.

Figure 3D:
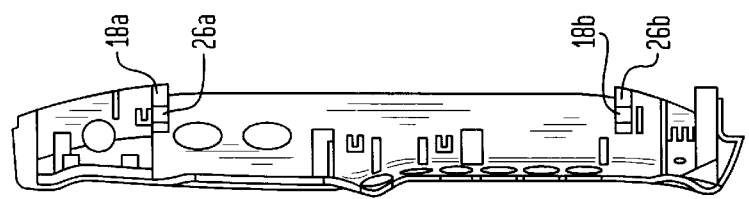
FIG. 3D shows a cross section of the upper housing through plane D—D shown in FIG. 3C.
Figure 3C:
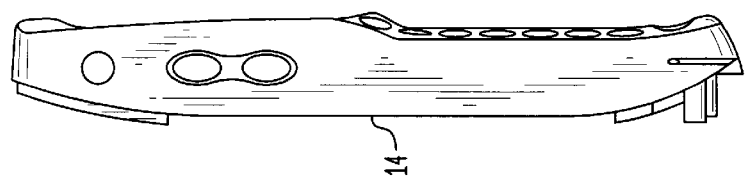
FIGS. 3A–C show, respectively, interior, left side, and exterior views of an upper housing according to the present invention.
Figure 3E:
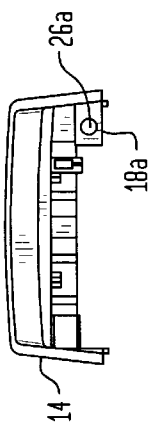
FIG. 3E shows a top view of an upper housing according to the present invention.
Figure 3B:
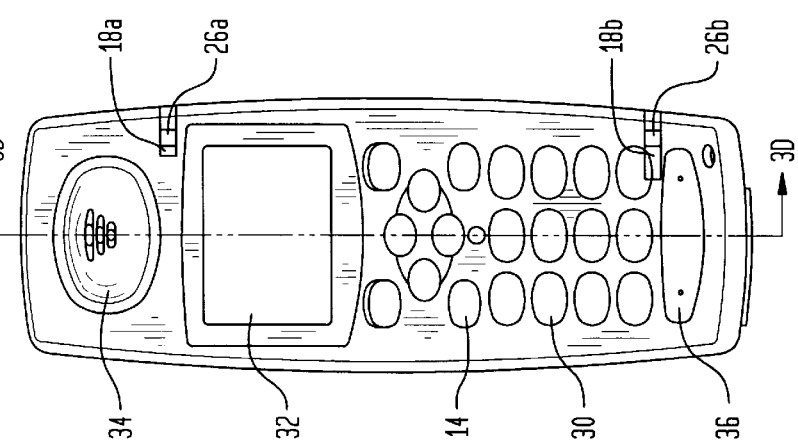
Figure 3A:
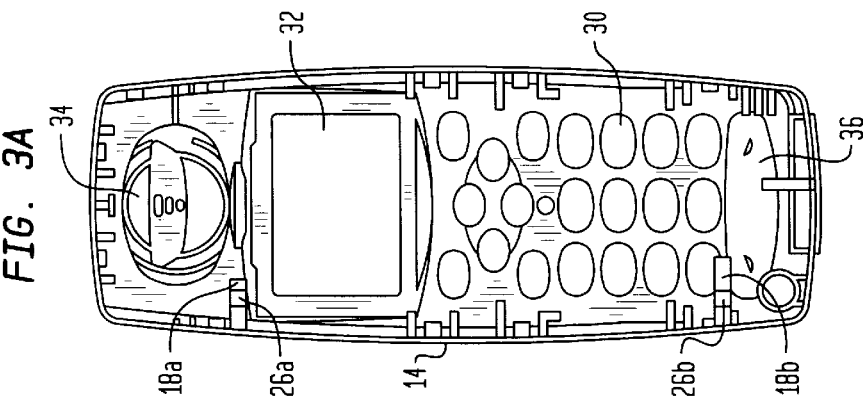

FIGS. 3A–C show, respectively, interior, left side, and exterior views of an upper housing 14 according to present invention. FIG. 3D shows a cross section of the upper housing 14 taken through the plane D—D shown in FIG. 3C, and FIG. 3E shows a top view. The apertures 26a, 26b in the interlock tabs 18a, 18b for receiving the antenna housing 12b can be seen in these figures. It will be appreciated that the interlock tabs 18a, 18b have a relatively small footprint. That means that it is possible to add them to existing designs with a minimum of retooling.

FIGS. 3A–E show an upper housing for use in a portable telephone unit. As such, the upper housing 14 includes on its front face an array of holes 30 to accommodate a keypad, as well as a window 32 for a display, an earpiece 34 and a mouthpiece 36. Of course, it would be possible to practice the present invention with other types of electrical devices as well.

Figure 4A:
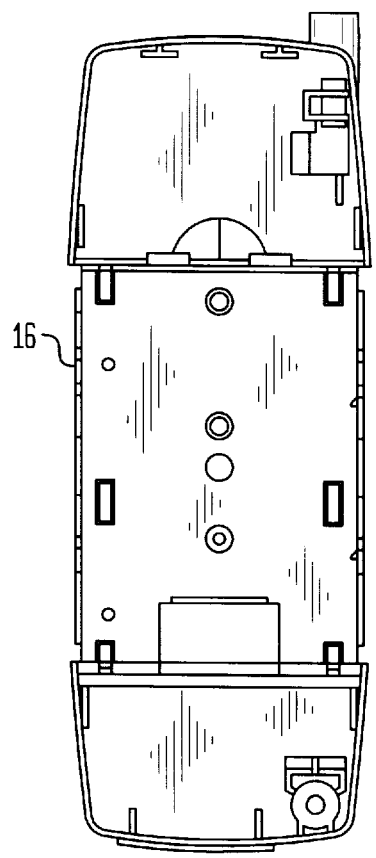
FIGS. 4A and 4B show, respectively, an exterior view and an interior perspective view of a lower housing for use with the upper housing shown in FIGS. 3A–E.
Figure 4B:
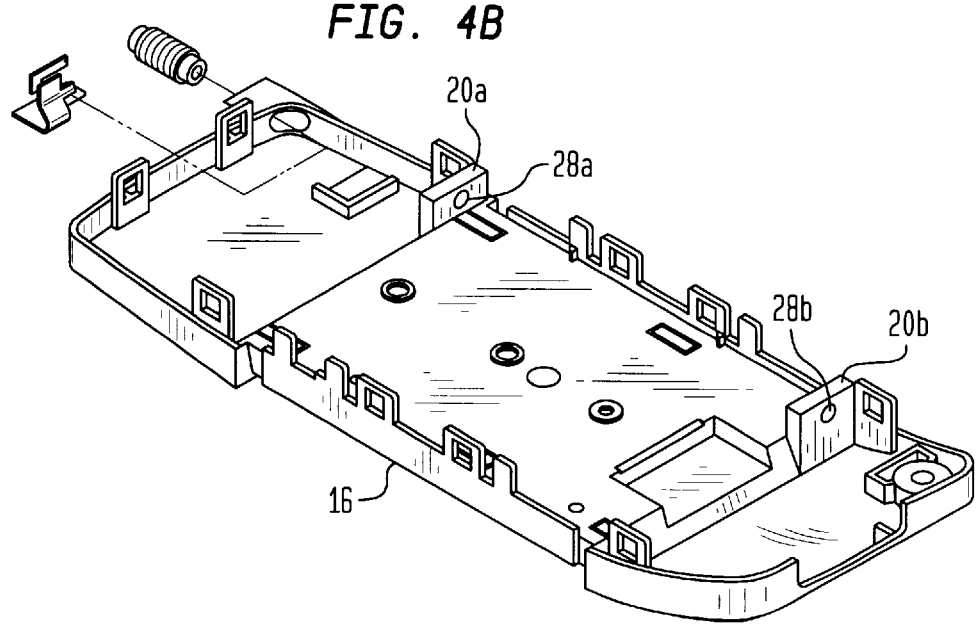

FIGS. 4A and 4B show, respectively, exterior and perspective interior views of a lower housing 16 for use with the upper housing 14 shown in FIGS. 3A–E. Again, it is apparent that the footprint of the interlock system is small enough so that it can be incorporated in present designs with a minimum of retooling.

Figure 5:
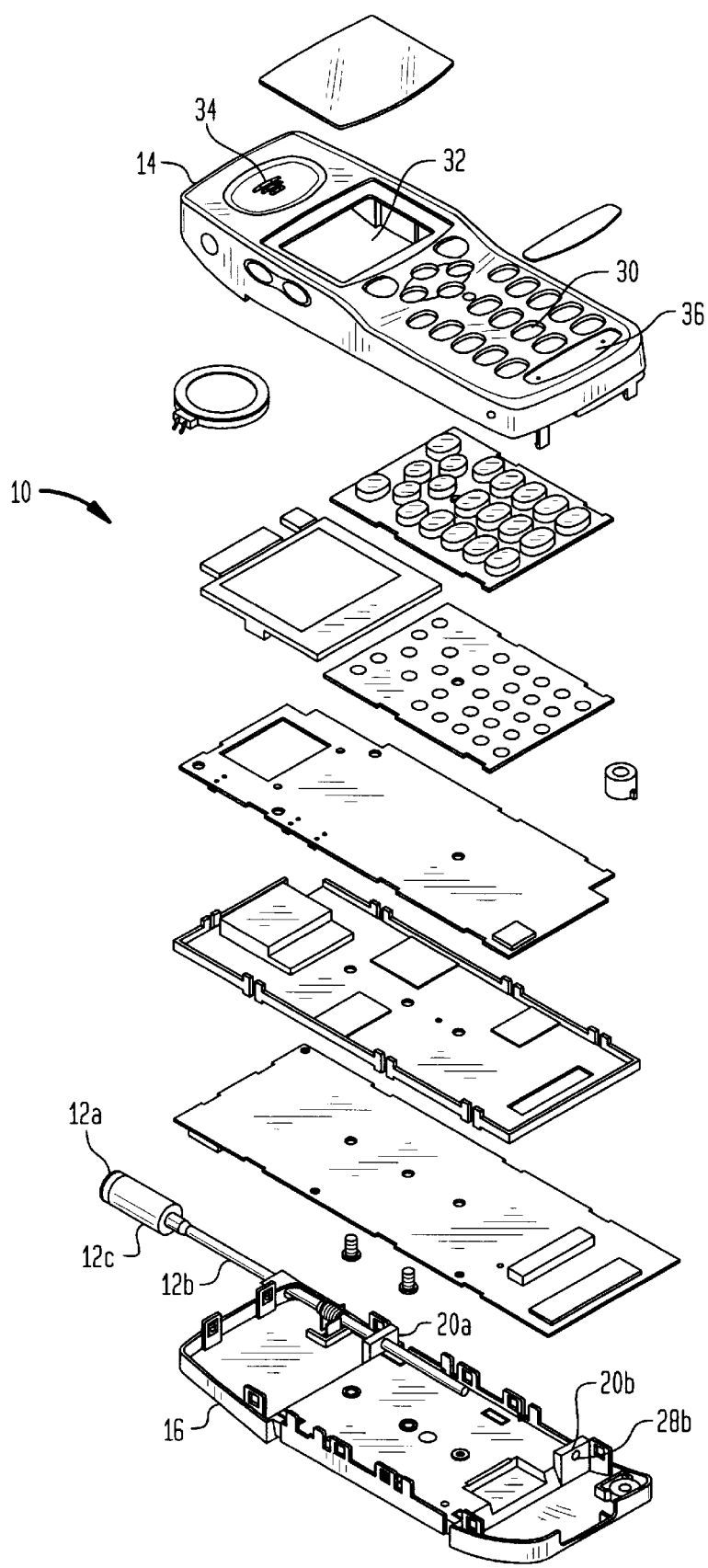
FIG. 5 shows an exploded perspective view of a portable telephone incorporating the upper and lower housings shown in FIGS. 3A–E and FIGS. 4A and 4B.

FIG. 5 shows an exploded view of a complete portable telephone incorporating the present invention. It is contemplated that the telephone will be first completely assembled without the antenna unit 12a, 12b. As described above, one embodiment of the present invention includes corresponding snap elements along the bottom edge of the upper and lower housings 14, 16 of the telephone 10 to hold the housings together until the antenna unit is inserted into the receiving apertures in the interlock tabs. It would, of course, also be possible to practice the present invention without the lower snap elements by manually holding the upper and lower housing together until the antenna unit is inserted.

The final stage of manufacture is the insertion of the antenna unit 12a, 12b into the receiving apertures 26a, 26b, 28a, 28b in the interlock tabs. Because all of the receiving apertures are now in alignment, a pathway is defined to receive the antenna housing. The antenna housing 12a is slid down the length of the pathway and then screwed into place using the corresponding threads on the antenna housing and the external opening.

The telephone may be disassembled for repair or maintenance by simply unscrewing the antenna housing 12a and pulling it out of the telephone. It will be appreciated that once the repairs are made, the telephone can be quickly reassembled in the field without the need for a screwdriver or other tool.

When assembled, the telephone exhibits enhanced strength because of the use of the antenna unit as both an antenna and as a brace extending down the length of the telephone. Thus, it will be appreciated that the present design exhibits greater resistance to breakage than the use of screws or other fastening elements currently used.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An antenna interlock system, comprising:

an upper housing and a lower housing;

first and second interlock tabs disposed along the interior wall of the upper housing and third and fourth interlock tabs disposed along the interior wall of the lower housing, each interlock tab having an aperture shaped to closely receive an antenna unit, the interlock tabs being disposed relative to each other such that when the upper and lower housings are assembled together, the apertures in the interlock tabs together define a pathway for receiving the antenna unit, and such that when the antenna unit is inserted through the receiving apertures, the antenna unit and the interlock tabs hold the upper and lower housings together.

2. A system according to claim 1, wherein the interlock tabs are disposed relative to each other such that when the lower and upper housings are assembled together, the first and second interlock tabs lie between the third and fourth interlock tabs, abutting them, thereby providing stability to the upper and lower housings along the longitudinal axis of the antenna unit.

3. A system according to claim 1, wherein the lower housing includes an external antenna opening for receiving the antenna unit, the external antenna opening being positioned such that when the upper and lower housings are assembled together, the external antenna opening and the apertures in the interlock tabs together define a pathway for receiving the antenna unit.

4. A system according to claim 3, wherein the external antenna opening is threaded, and wherein the antenna unit has a threaded portion corresponding to the threads in the external antenna opening such that when the antenna unit is inserted through the external antenna opening into the receiving apertures, the threaded portion of the antenna unit engages the threads in the external antenna opening.

5. A system according to claim 3, wherein the external antenna opening comprises corresponding halves that are molded into the upper and lower housings.

6. A system according to claim 3, wherein the upper and lower housings include a twist fit arrangement for holding the antenna housing in place after it is inserted through the external antenna opening and the receiving apertures.

7. A system according to claim 3, wherein the upper and lower housings include a snap fit arrangement for holding the antenna housing in place after it is inserted through the external antenna opening and the receiving apertures.

8. A system according to claim 1, wherein the interlock tabs are located proximate to a side of the upper and lower housings.

9. A system according to claim 1, wherein the interlock tabs are integrally molded with the upper and lower housings.

10. A system according to claim 1, wherein the upper housing includes a snap element at one end that attaches to a corresponding snap element on the lower housing.

11. A portable telephone, comprising:
    an upper housing and a lower housing;
    an interlock tab mounted to each of the upper housing and lower housings, each interlock tab having an aperture shaped to closely receive an antenna unit,
    the interlock tabs being disposed relative to each other such that when the upper and lower housings are assembled together, the apertures in the interlock tabs together define a pathway for receiving the antenna unit, such that when the antenna unit is inserted through the receiving apertures, the antenna unit and the interlock tabs hold the upper and lower housings together.

12. A portable telephone according to claim 11, wherein the upper housing includes on its front face an array of holes to accommodate a keypad, a display window, an earpiece, and a mouthpiece.

13. A portable telephone according to claim 11, wherein there are first and second interlock tabs mounted to the interior wall of the upper housing and third and fourth interlock tabs mounted to the interior wall of the lower housing, each interlock tab having an aperture shaped to closely receive the antenna unit,
    the interlock tabs being disposed relative to each other such that when the upper and lower housings are assembled together, the apertures in the interlock tabs together define a pathway for receiving the antenna unit, and such that when the antenna unit is inserted into the receiving apertures, the antenna unit and the interlock tabs hold the upper and lower housings together.

14. A portable telephone according to claim 13, wherein the interlock tabs are disposed relative to each other such that when the lower and upper housings are assembled together, the first and second interlock tabs lie between the third and fourth interlock tabs, abutting them, thereby providing stability to the upper and lower housings along the longitudinal axis of the antenna unit.

15. A portable telephone according to claim 11, wherein the lower housing includes a threaded external antenna opening for receiving the antenna unit, the external antenna opening being positioned such that when the upper and lower housings are assembled together, the external antenna opening and the apertures in the interlock tabs together define a pathway for receiving the antenna unit, the antenna unit having a threaded portion corresponding to the threads in the external antenna opening such that when the antenna unit is inserted into the receiving apertures, the threaded portion of the antenna unit engages the threads in the external antenna opening.

16. A method for locking together an electrical apparatus having an upper housing, a lower housing, and an antenna unit, the method comprising:

(a) providing first and second interlock tabs disposed along the interior wall of the lower housing and third and fourth interlock tabs disposed along the interior wall of the upper housing, each interlock tab having an aperture shaped to closely receive an antenna unit, the interlock tabs being disposed relative to each other such that when the upper and lower housings are assembled together, the apertures in the interlock tabs together define a pathway for receiving the antenna unit;

(b) holding the upper and lower housings together such that the receiving apertures are in alignment;

(c) inserting the antenna unit into the receiving apertures such that the antenna and the interlock tabs holding the lower and upper housings together.

17. A method according to claim 16, wherein step (a) includes providing corresponding snaps elements at one end of the upper and lower housings, and wherein step (b) includes snapping the snap elements together.

18. A method according to claim 16, wherein the electrical apparatus is a portable telephone, and wherein the method includes the following additional step (a1) between steps (a) and (b):

(a1) assembling the portable telephone between the lower and upper housings.

* * * * *